(12) United States Patent
Vantomme et al.

(10) Patent No.: US 10,465,021 B2
(45) Date of Patent: Nov. 5, 2019

(54) UNCOMPOUNDED PARTICULATE METALLOCENE-PRODUCED POLYETHYLENE

(71) Applicant: TOTAL RESEARCH & TECHNOLOGY FELUY, Seneffe (BE)

(72) Inventors: Aurelien Vantomme, Bois-de-Villers (BE); Christopher Willocq, Bousval (BE); Daan Dewachter, Mechelen (BE)

(73) Assignee: FINA TECHNOLOGY, INC., Houston, TX (US)

( * ) Notice: Subject to any disclaimer, the term of this patent is extended or adjusted under 35 U.S.C. 154(b) by 0 days.

(21) Appl. No.: 14/417,735

(22) PCT Filed: Jul. 26, 2013

(86) PCT No.: PCT/EP2013/065833
§ 371 (c)(1),
(2) Date: Jan. 27, 2015

(87) PCT Pub. No.: WO2014/016418
PCT Pub. Date: Jan. 30, 2014

(65) Prior Publication Data
US 2015/0166697 A1    Jun. 18, 2015

(30) Foreign Application Priority Data

Jul. 27, 2012 (EP) ..................................... 12178363
Jul. 27, 2012 (EP) ..................................... 12178369

(51) Int. Cl.
| | | |
|---|---|---|
| C08F 210/16 | (2006.01) | |
| C08F 110/02 | (2006.01) | |
| C08F 10/02 | (2006.01) | |
| C08L 23/08 | (2006.01) | |
| C08F 4/6592 | (2006.01) | |

(52) U.S. Cl.
CPC ............ C08F 110/02 (2013.01); C08F 10/02 (2013.01); *C08F 4/65927* (2013.01); *C08F 210/16* (2013.01); *C08L 23/0815* (2013.01); *C08L 2205/025* (2013.01)

(58) Field of Classification Search
CPC ...... C08F 110/02; C08F 10/02; C08F 210/16; C08F 2/04; C08F 2/06; C08F 2/12; C08F 2/14; C08F 2500/05; C08F 2500/24; C08F 297/083; C08L 23/06; C08L 23/0815; C08L 2205/025; C08L 2205/035; C08L 2308/00
USPC ..................... 526/65, 348, 352; 525/53, 240
See application file for complete search history.

(56) References Cited

U.S. PATENT DOCUMENTS

| | | | |
|---|---|---|---|
| 5,539,076 A * | 7/1996 | Nowlin | B29C 47/0883 525/240 |
| 5,698,642 A | 12/1997 | Govoni et al. | |
| 6,413,477 B1 | 7/2002 | Govoni et al. | |
| 6,864,207 B2 | 3/2005 | Knoeppel et al. | |
| 6,930,071 B2 | 8/2005 | Knoeppel et al. | |
| 2008/0021158 A1 | 1/2008 | Takahashi et al. | |
| 2008/0286509 A1* | 11/2008 | Kipke | C08F 10/02 428/35.5 |
| 2008/0312380 A1* | 12/2008 | Kwalk | C08L 23/06 525/240 |

FOREIGN PATENT DOCUMENTS

| | | |
|---|---|---|
| EP | 1316566 A2 | 6/2003 |
| EP | 1884527 A1 | 2/2008 |
| JP | 2007-146084 A | 6/2007 |

OTHER PUBLICATIONS http://www.sigmaaldrich.com/chemistry/stockroom-reagents/learning-center/technical-library/particle-size-conversion.html; 2017.*
International Search Report issued in PCT/EP2013/065833 dated Sep. 5, 2013 (3 pages).

* cited by examiner

*Primary Examiner* — Roberto Rabago
(74) *Attorney, Agent, or Firm* — Albert Shung (57) ABSTRACT

An uncompounded particulate metallocene-produced polyethylene can have a multimodal molecular weight distribution and particle size distribution measured by obtaining at least four fractions by sieving. A set of Mw values including an Mw value for each fraction can be obtained. A set of Mn values including an Mn value for each fraction can be obtained. A ratio between a standard deviation value of the Mw set and a mean value of the Mw set can be equal to or less than 0.15. A ratio between a standard deviation value of the Mn set and a mean value of the Mn set can be equal to or less than 0.15. The uncompounded particulate metallocene-produced polyethylene can be prepared by a process that includes polymerization in an apparatus. The apparatus can include at least three serially connected loop reactors.

8 Claims, 3 Drawing Sheets

UNCOMPOUNDED PARTICULATE METALLOCENE-PRODUCED POLYETHYLENE

CROSS REFERENCE TO RELATED APPLICATIONS

This application is a National Stage Entry of PCT/EP2013/065833, filed on Jul. 26, 2013, which claims priority from European Application No. 12178369.0, filed on Jul. 27, 2012 and European Application No. 12178363.3, filed on Jul. 27, 2012.

TECHNICAL FIELD OF THE INVENTION

The invention is in the field of polymers technology. In particular, the present invention relates to metallocene-produced polyethylene resin.

BACKGROUND OF THE INVENTION

Polyethylene (PE) is synthesized by polymerizing ethylene ($CH_2=CH_2$) monomers. Because it is cheap, safe, stable to most environments and easy to be processed, polyethylene polymers are useful in many applications. According to the properties, polyethylene can be classified into several types, such as but not limited to LDPE (Low Density Polyethylene), LLDPE (Linear Low Density Polyethylene), and HDPE (High Density Polyethylene). In another classification, the used polyethylene can be classified as Ultra High Molecular Weight (UHMW), High Molecular Weight (HMW), Medium Molecular Weight (MMW) and Low Molecular Weight (LMW). Each type of polyethylene has different properties and characteristics.

Ethylene polymerization processes are frequently carried out in a loop reactor using ethylene monomer, liquid diluent and catalyst, optionally one or more co-monomer(s), optionally an activating agent or co-catalyst and optionally hydrogen. The polymerization in a loop reactor is usually performed under slurry conditions, with the produced polymer usually in the form of solid particles which are suspended in the diluent. The slurry in the reactor is circulated continuously with a pump to maintain efficient suspension of the polymer solid particles in the liquid diluent. Polymer slurry is discharged from the loop reactor by means of settling legs, which operate on a batch principle to recover the slurry. Settling in the legs is used to increase the solids concentration of the slurry finally recovered as product slurry. The product slurry is further discharged through heated flash lines to a flash tank, where most of the diluent and unreacted monomers are flashed off and recycled.

After the polymer product is collected from the reactor and the hydrocarbon residues are removed, the polymer product is dried, additives can be added and finally the polymer may be mixed and pelletized. The resulting product can then be used for the manufacturing of various objects.

The molecular weight distribution is of great influence for polymer processing. Polyethylenes with narrow molecular weight distribution lead to products with greater dimensional stability, higher impact resistance, and higher resistance to environment stress-cracking as compared to those having broad molecular weight distribution. On the other hand, polyethylenes having broad molecular weight distribution show greater flowability in the molten state at high shear rate, which is important for blowing and extraction techniques. Thus, there is a need to control the molecular weight distribution of polyethylenes.

SUMMARY OF THE INVENTION

The present inventors have prepared metallocene produced polyethylene resins having molecular weight distribution which did not vary with particle size of the polyethylene.

In an first aspect, the present invention provides an uncompounded particulate metallocene-produced polyethylene having a multimodal molecular weight distribution, said particulate polyethylene having a particle size distribution, the particle size distribution being measured by obtaining at least 4 fractions by sieving (M1, M2, M3, M4 . . . ), one faction containing the upper particle size, one fraction containing the lower particle size, and the other fractions containing particle sizes in between the upper and lower sizes, whereby a set of Mw values is obtained, which set comprises the Mw of each fraction (M1, M2, M3, M4, . . . ), with Mw being the weight-average molecular weight, a set of Mn values is obtained, which set comprises the Mn of each fraction (M1, M2, M3, M4), with Mn being the number-average molecular weight, a mean value and standard deviation value are obtained for the Mw set, and a mean value and standard deviation value are obtained for the Mn set, and characterized in that the ratio between the standard deviation value of the Mw set and the mean value of the Mw set is equal to or less than 0.15;

and the ratio between the standard deviation value of the Mn set and the mean value of the Mn set is equal to or less than 0.15.

In a second aspect, the invention further encompasses formed articles comprising the uncompounded particulate metallocene-produced polyethylene according to the first aspect of the invention.

In a third aspect, the present invention further encompasses a process for preparing the uncompounded particulate metallocene-produced polyethylene according to the first aspect of the invention, in at least three serially connected reactors, comprising the steps of: (i) polymerizing ethylene, optionally a comonomer, in the presence of a metallocene catalyst in the first reactor to produce a first polyethylene fraction, (ii) feeding the first polyethylene fraction thereby produced, to the second reactor serially connected to the first reactor, and in the second reactor polymerizing ethylene and optionally a comonomer in the presence of the first polyethylene fraction thereby producing a second polyethylene fraction; and (iii) feeding the second polyethylene fraction thereby produced, to a third reactor serially connected to the second reactor, and in the third reactor polymerizing ethylene and optionally a comonomer in the presence of the second polyethylene fraction thereby producing the polyethylene product.

In a fourth aspect, the present invention also encompasses a process for the polymerization of olefin, such as ethylene, in at least three slurry loop reactors connected in series, comprising the step of: polymerizing an olefin, such as ethylene in the presence of at least one catalyst, such as a metallocene catalyst, optionally one or more co-monomers, and optionally hydrogen, thereby obtaining an polyolefin product, such as the uncompounded particulate metallocene-produced polyethylene according to the first aspect of the invention, wherein each of the at least three slurry loop reactors comprises two vertical pipes, one upper segment, one lower segment of reactor piping, joined end to end by junctions to form a complete loop, one or more feed lines (3, 30, 300), one or more outlets, one or more cooling jackets per pipe, and at least one pump.

In a fifth aspect, the present invention also encompasses an apparatus for the production of polyolefin comprising at least three loop reactors connected in series, wherein each of the at least three loop reactors comprises two vertical pipes, one upper segment, one lower segment of reactor piping, joined end to end by junctions to form a complete loop, one or more feed lines, one or more outlets, one or more cooling jackets per pipe, and at least one pump.

The present invention also encompasses an apparatus configured for preparing the uncompounded particulate metallocene-produced polyethylene according to the first aspect of the invention, said apparatus comprising at least three loop reactors connected in series (1, 10, 100), wherein each of the at least three loop reactors comprises two vertical pipes (7, 70, 700), one upper segment, one lower segment of reactor piping, joined end to end by junctions to form a complete loop, one or more feed lines (3, 30, 300), one or more outlets (8, 80, 800), one or more cooling jackets (9, 90, 900) per pipe, and at least one pump (2, 20, 200).

The present invention also relates to a process for preparing the uncompounded particulate metallocene-produced polyethylene according to the first aspect of the present invention, in the apparatus according to the fifth aspect of the invention, comprising at least three slurry loop reactors connected in series (1, 10, 100), comprising the step of: polymerizing an olefin in the presence of at least one metallocene catalyst, optionally one or more co-monomers, and optionally hydrogen in said apparatus, thereby obtaining said uncompounded particulate metallocene-produced polyethylene.

The present invention also encompasses the uncompounded particulate metallocene-produced polyethylene according to the first aspect of the present invention, prepared in the apparatus according to the fifth aspect of the invention; or according to the process according to the third or fourth aspects of the present invention.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. The reference numbers relate to the hereto-annexed figures.

DETAILED DESCRIPTION OF INVENTION

Before the present method used in the invention is described, it is to be understood that this invention is not limited to particular methods, components, or devices described, as such methods, components, and devices may, of course, vary. It is also to be understood that the terminology used herein is not intended to be limiting, since the scope of the present invention will be limited only by the appended claims.

When describing the polyethylenes and processes of the invention, the terms used are to be construed in accordance with the following definitions, unless a context dictates otherwise.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all numbers and fractions subsumed within the respective ranges, as well as the recited endpoints.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

All documents cited in the present specification are hereby incorporated by reference in their entirety.

The present invention provides uncompounded particulate metallocene-produced polyethylene having a multimodal molecular weight distribution, said particulate polyethylene having a particle size distribution,
the particle size distribution being measured by obtaining at least 4 fractions by sieving (M1, M2, M3, M4 . . . ), one faction containing the upper particle size, one fraction containing the lower particle size, and the other fractions containing particle sizes in between the upper and lower sizes,
whereby
a set of Mw values is obtained, which set comprises the Mw of each fraction (M1, M2, M3, M4, . . . ), with Mw being the weight-average molecular weight,
a set of Mn values is obtained, which set comprises the Mn of each fraction (M1, M2, M3, M4), with Mn being the number-average molecular weight,
a mean value and standard deviation value are obtained for the Mw set, and
a mean value and standard deviation value are obtained for the Mn set, and
characterized in that $$STDEV(Mw_{M1},Mw_{M2},Mw_{M3},Mw_{M4}, \ldots )/ AVERAGE(Mw_{M1},Mw_{M2},Mw_{M3},Mw_{M4}, \ldots )* 100 \leq 15\%,$$

and $$STDEV(Mn_{M1},Mn_{M2},Mn_{M3},Mn_{M4}, \ldots )/ AVERAGE(Mn_{M1},Mn_{M2},Mn_{M3},Mn_{M4}, \ldots )* 100 \leq 15\%.$$

As used herein, STDEV refers to standard deviation, and uses the following formula:

$$\sqrt{\frac{\sum (x-\bar{x})^2}{(n-1)}}$$

wherein x is the Mw or Mn of each fraction, $\bar{x}$ is the mean of Mw or Mn of all fractions, and n is the number of fractions.

In an embodiment, particle size was determined by sieving according to the method ASTM D 1921-89 Test Method A.

In an embodiment, said uncompounded particulate metallocene-produced polyethylene has a multimodal molecular weight distribution, said particulate polyethylene having a particle size distribution defining a weight percent material for a given range of particle size following the method of ASTM D 1921-89 Test Method A. This particle size distribution is measured by multiple sieves selected to span the particle size of the material.

In an embodiment, the following sieves sizes porosity were used: 2000 µm, 1600 µm, 1000 µm, 500 µm, 250 µm, 125 µm and 63 µm, to obtain fractions having the following ranges: 2000-1500 µm; 1600-1000 µm; 1000-500 µm; 500-250 µm; 250-125; 125-63 µm; 63-0 µm.

A weight-average molecular weight ($Mw_{a\text{-}b\ \mu m}$), a number-average molecular weight ($Mn_{a\text{-}b\ \mu m}$), is associated to each fraction, defining a Mw set and a Mn set, wherein a-b µm is the particle size range defined by the concomitant sieves porosity, a mean value and standard deviation value are obtained for the Mw set, and a mean value and standard deviation value are obtained for the Mn set, and
the ratio between the standard deviation value of the Mw set and the mean value of the Mw set is equal to or less than 0.15;
and
the ratio between the standard deviation value of the Mn set and the mean value of the Mn set is equal to or less than 0.15.

The molecular weights (weight average and number average) were determined by Size Exclusion Chromatography (SEC) at high temperature (145° C.). Analytical conditions for the GPCV 2000 from Waters are: 10 mg polyethylene sample dissolved at 160° C. in 10 ml of trichlorobenzene for 1 hour. Injection volume: about 400 µl, automatic sample preparation and injection temperature: 160° C. Column temperature: 145° C. Detector temperature: 160° C. Two Shodex AT-806MS (Showa Denko) and one Styragel HT6E (Waters) columns were used with a flow rate of 1 ml/min. Detector: Infrared detector (2800-3000 cm-1). Calibration: narrow standards of polystyrene (PS) (commercially available). Calculation of molecular weight Mi of each fraction i of eluted polyethylene is based on the Mark-Houwink relation ($\log_{10}(M_{PE})=0.965909-\log_{10}(M_{PS})-0.28264$) (cut off on the low molecular weight end at $M_{PE}=1000$).

The molecular weight averages used in establishing molecular weight/property relationships are the number average (Mn), weight average (Mw) and z average (Mz) molecular weight. These averages are defined by the following expressions and are determined form the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i M_i} = \frac{\sum_i h_i M_i}{\sum_i M_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight Mi. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

In an embodiment, the Mw of the uncompounded particulate metallocene-produced polyethylene is in the range of 25000 to 300000 Da.

In an embodiment, the ratio Mw/Mn of the uncompounded particulate metallocene-produced polyethylene is within the range of 3.5 to 14.0, for example within the range of 4.0 to 13.0, more preferably within the range of 6.0 to 9.0.

In an embodiment, the ratio Mz/Mw of the uncompounded particulate metallocene-produced polyethylene is within the range of 2.5 and 6.0.

As used herein the term "uncompounded particulate metallocene-produced polyethylene" refers to homo- or copolymer of ethylene produced with a catalyst comprising a metallocene. Preferably the catalyst comprises a metallocene on a solid support. More preferably the catalyst comprises a metallocene and a cocatalyst on a solid support. More preferably the catalyst comprises a metallocene on a silica/aluminoxane support.

The term "metallocene catalyst" is used herein to describe any transition metal complexes comprising metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In one embodiment of the present invention, the metallocene catalyst is a compound of formula (I) or (II)

$$(Ar)_2MQ_2 \quad (I);$$

or

$$R''(Ar)_2MQ_2 \quad (II),$$

wherein the metallocenes according to formula (I) are non-bridged metallocenes and the metallocenes according to formula (II) are bridged metallocenes;
wherein said metallocene according to formula (I) or (II) has two Ar bound to M which can be the same or different from each other;
wherein Ar is an aromatic ring, group or moiety and wherein each Ar is independently selected from the group consisting of cyclopentadienyl, indenyl (IND), tetrahydroindenyl (THI), and fluorenyl, wherein each of said groups may be optionally substituted with one or more substituents each independently selected from the group consisting of halogen, hydrosilyl, $SiR_3$ wherein R is a hydrocarbyl having 1 to 20 carbon atoms, and a hydrocarbyl having 1 to 20 carbon atoms, and wherein said hydrocarbyl optionally contains one or more atoms selected from the group comprising B, Si, S, O, F, Cl, and P;
wherein M is a transition metal selected from the group consisting of titanium, zirconium, hafnium, and vanadium; and preferably is zirconium;
wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl, and P; and
wherein R'' is a divalent group or moiety bridging the two Ar groups and selected from the group consisting of $C_1$-$C_{20}$ alkylene, germanium, silicon, siloxane, alkylphosphine, and an amine, and wherein said R'' is optionally substituted with one or more substituents each independently selected from the group consisting of halogen, hydrosilyl, $SiR_3$ wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl, and P.

Preferably, the polymerization is carried out in the presence of a metallocene comprising a bridged bis-indenyl and/or a bridged bis-tetrahydrogenated indenyl catalyst component. The metallocene can be selected from one of the following formula (IVa) or (IVb):

(IVa)

(IVb)

wherein each R in formula (IVa) or (IVb) is the same or different and is selected independently from hydrogen or $XR'_v$, in which X is chosen from Group 14 of the Periodic Table (preferably carbon), oxygen or nitrogen and each R' is the same or different and is chosen from hydrogen or a hydrocarbyl of from 1 to 20 carbon atoms and v+1 is the valence of X, preferably R is a hydrogen, methyl, ethyl, n-propyl, iso-propyl, n-butyl, tert-butyl group; R'' is a structural bridge between the two indenyl or tetrahydrogenated indenyls that comprises a $C_1$-$C_4$ alkylene radical, a dialkyl germanium, silicon or siloxane, or an alkyl phosphine or amine radical; Q is a hydrocarbyl radical having from 1 to 20 carbon atoms or a halogen, preferably Q is F, Cl or Br; and M is a transition metal Group 4 of the Periodic Table or vanadium.

Each indenyl or tetrahydro indenyl component may be substituted with R in the same way or differently from one another at one or more positions of either of the fused rings. Each substituent is independently chosen.

If the cyclopentadienyl ring is substituted, its substituent groups must not be so bulky so as to affect coordination of the olefin monomer to the metal M. Any substituents $XR'_v$ on the cyclopentadienyl ring are preferably methyl. More preferably, at least one and most preferably both cyclopentadienyl rings are unsubstituted.

In a particularly preferred embodiment, the metallocene comprises a bridged unsubstituted bis-indenyl and/or bis-tetrahydrogenated indenyl i.e. all R are hydrogens. More preferably, the metallocene comprises a bridged unsubstituted bis-tetrahydrogenated indenyl.

Illustrative examples of metallocene catalysts comprise but are not limited to bis(cyclopentadienyl) zirconium dichloride ($Cp_2ZrCl_2$), bis(cyclopentadienyl) titanium dichloride ($Cp_2TiCl_2$), bis(cyclopentadienyl) hafnium dichloride ($Cp_2HfCl_2$); bis(tetrahydroindenyl) zirconium dichloride, bis(indenyl) zirconium dichloride, and bis(n-butyl-cyclopentadienyl) zirconium dichloride; ethylenebis(4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene [1-(4-tert-butyl-2-methyl-cyclopentadienyl)](fluoren-9-yl) zirconium dichloride.

Most preferably the metallocene is ethylene-bis(tetrahydroindenyl)zirconium dichloride or ethylene-bis(tetrahydroindenyl) zirconium difluoride.

As used herein, the term "hydrocarbyl having 1 to 20 carbon atoms" refers to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl.

As used herein, the term "hydrocarboxy having 1 to 20 carbon atoms" refers to a moiety with the formula hydrocarbyl-O—, wherein the hydrocarbyl has 1 to 20 carbon atoms as described herein. Preferred hydrocarboxy groups are selected from the group comprising alkyloxy, alkenyloxy, cycloalkyloxy or aralkoxy groups.

As used herein, the term "alkyl", by itself or as part of another substituent, refers to straight or branched saturated hydrocarbon group joined by single carbon-carbon bonds having 1 or more carbon atom, for example 1 to 12 carbon atoms, for example 1 to 6 carbon atoms, for example 1 to 4 carbon atoms. When a subscript is used herein following a carbon atom, the subscript refers to the number of carbon atoms that the named group may contain. Thus, for example, $C_{1-12}$ alkyl means an alkyl of 1 to 12 carbon atoms.

Examples of alkyl groups are methyl, ethyl, propyl, isopropyl, butyl, isobutyl, sec-butyl, tert-butyl, 2-methylbutyl, pentyl and its chain isomers, hexyl and its chain isomers, heptyl and its chain isomers, octyl and its chain isomers, nonyl and its chain isomers, decyl and its chain isomers, undecyl and its chain isomers, dodecyl and its chain isomers. Alkyl groups have the general formula $C_nH_{2n+1}$.

As used herein, the term "cycloalkyl", by itself or as part of another substituent, refers to a saturated or partially saturated cyclic alkyl radical. Cycloalkyl groups have the general formula $C_nH_{2n-1}$. When a subscript is used herein following a carbon atom, the subscript refers to the number of carbon atoms that the named group may contain. Thus, examples of $C_{3-6}$ cycloalkyl include cyclopropyl, cyclobutyl, cyclopentyl, or cyclohexyl.

As used herein, the term "aryl", by itself or as part of another substituent, refers to a radical derived from an aromatic ring, such as phenyl, naphthyl, indanyl, or 1,2,3,4-tetrahydro-naphthyl. When a subscript is used herein following a carbon atom, the subscript refers to the number of carbon atoms that the named group may contain.

As used herein, the term "alkylaryl", by itself or as part of another substituent, refers to refers to an aryl group as defined herein, wherein a hydrogen atom is replaced by an alkyl as defined herein. When a subscript is used herein following a carbon atom, the subscript refers to the number of carbon atoms that the named group or subgroup may contain.

As used herein, the term "arylalkyl", by itself or as part of another substituent, refers to refers to an alkyl group as defined herein, wherein a hydrogen atom is replaced by a aryl as defined herein. When a subscript is used herein following a carbon atom, the subscript refers to the number of carbon atoms that the named group may contain. Examples of $C_{6-10}$aryl$C_{1-6}$alkyl radicals include benzyl, phenethyl, dibenzylmethyl, methylphenylmethyl, 3-(2-naphthyl)-butyl, and the like.

As used herein, the term "alkylene", by itself or as part of another substituent, refers to alkyl groups that are divalent, i.e., with two single bonds for attachment to two other groups. Alkylene groups may be linear or branched and may be substituted as indicated herein. Non-limiting examples of alkylene groups include methylene (—$CH_2$—), ethylene (—$CH_2$—$CH_2$—), methylmethylene (—$CH(CH_3)$—), 1-methyl-ethylene (—$CH(CH_3)$—$CH_2$—), n-propylene (—$CH_2$—$CH_2$—$CH_2$—), 2-methylpropylene (—$CH_2$—$CH(CH_3)$—$CH_2$—), 3-methylpropylene (—$CH_2$—$CH_2$—$CH(CH_3)$—), n-butylene (—$CH_2$—$CH_2$—$CH_2$—$CH_2$—), 2-methylbutylene (—$CH_2$—$CH(CH_3)$—$CH_2$—$CH_2$—), 4-methylbutylene (—$CH_2$—$CH_2$—$CH_2$—$CH(CH_3)$—), pentylene and its chain isomers, hexylene and its chain isomers, heptylene and its chain isomers, octylene and its chain isomers, nonylene and its chain isomers, decylene and its chain isomers, undecylene and its chain isomers, dodecylene and its chain isomers. When a subscript is used herein following a carbon atom, the subscript refers to the number of carbon atoms that the named group may contain. For example, $C_1$-$C_{20}$ alkylene refers to an alkylene having between 1 and 20 carbon atoms.

Exemplary halogen atoms include chlorine, bromine, fluorine and iodine, wherein fluorine and chlorine are preferred.

The metallocene catalysts used herein are provided on a solid support. The support can be an inert organic or inorganic solid, which is chemically unreactive with any of the components of the conventional metallocene catalyst. Suitable support materials for the supported catalyst include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is a silica compound. In a preferred embodiment, the metallocene catalyst is provided on a solid support, preferably a silica support. The silica may be in granular, agglomerated, fumed or other form.

In an embodiment, the support of the metallocene catalyst is a porous support, and preferably a porous silica support having a surface area comprised between 200 and 900 m²/g. In another embodiment, the support of the polymerization catalyst is a porous support, and preferably a porous silica support having an average pore volume comprised between 0.5 and 4 ml/g. In yet another embodiment, the support of the polymerization catalyst is a porous support, and preferably a porous silica support having an average pore diameter comprised between 50 and 300 Å, and preferably between 75 and 220 Å.

Preferably, the supported metallocene catalyst is activated. The cocatalyst, which activates the metallocene catalyst component, can be any cocatalyst known for this purpose such as an aluminium-containing cocatalyst, a boron-containing cocatalyst or a fluorinated catalyst. The aluminium-containing cocatalyst may comprise an alumoxane, an alkyl aluminium, a Lewis acid and/or a fluorinated catalytic support.

In an embodiment, alumoxane is used as an activating agent for the metallocene catalyst. The alumoxane can be used in conjunction with a catalyst in order to improve the activity of the catalyst during the polymerization reaction.

As used herein, the term "alumoxane" and "aluminoxane" are used interchangeably, and refer to a substance, which is capable of activating the metallocene catalyst. In an embodiment, alumoxanes comprise oligomeric linear and/or cyclic alkyl alumoxanes. In a further embodiment, the alumoxane has formula (V) or (VI)

$$R^a—(Al(R^a)—O)_x—AlR^a_2 \quad (V)$$

for oligomeric, linear alumoxanes; or $$(—Al(R^a)—O—)_y \quad (VI)$$

for oligomeric, cyclic alumoxanes
wherein x is 1-40, and preferably 10-20;
wherein y is 3-40, and preferably 3-20; and
wherein each $R^a$ is independently selected from a $C_1$-$C_6$alkyl, and preferably is methyl. In a preferred embodiment, the alumoxane is methylalumoxane (MAO).

In a preferred embodiment, the supported metallocene catalyst is a supported metallocene-alumoxane catalyst comprising a metallocene and an alumoxane which are bound on a porous silica support.

One or more aluminiumalkyl represented by the formula $AlR^a_x$ can be used as additional co-catalyst, wherein each $R^a$ is the same or different and is selected from halogens or from alkoxy or alkyl groups having from 1 to 12 carbon atoms and x is from 1 to 3. Non-limiting examples are Tri-Ethyl Aluminum (TEAL), Tri-Iso-Butyl Aluminum (TIBAL), Tri-Methyl Aluminum (TMA), and Methyl-Methyl-Ethyl Aluminum (MMEAL). Especially suitable are trialkylaluminiums, the most preferred being triisobutylaluminium (TIBAL) and triethylaluminum (TEAL).

Suitable ethylene polymerization includes but is not limited to homopolymerization of ethylene, copolymerization of ethylene and a higher 1-olefin co-monomer.

As used herein, the term "co-monomer" refers to olefin co-monomers which are suitable for being polymerized with alpha-olefin monomer. Co-monomers may comprise but are not limited to aliphatic C3-C20 alpha-olefins. Examples of suitable aliphatic C3-C20 alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene, and 1-eicosene.

The term "co-polymer" refers to a polymer, which is made by linking two different types of in the same polymer chain. The term "homo-polymer" refers to a polymer which is made by linking ethylene monomers, in the absence of co-monomers. In an embodiment of the present invention, said co-monomer is 1-hexene.

According to the invention, the metallocene produced polyethylene has a multimodal molecular weight distribution. In one embodiment of the present invention, the multimodal molecular weight distribution is a bimodal molecular weight distribution. Preferably, the metallocene produced polyethylene has a bimodal molecular weight distribution.

By the term "monomodal polyethylene" or "polyethylene with a monomodal molecular weight distribution" it is meant, polyethylene having one maxima in their molecular weight distribution curve defined also as unimodal distribution curve. By the term "polyethylene with a bimodal molecular weight distribution" or "bimodal polyethylene" it is meant, polyethylene having a distribution curve being the sum of two unimodal molecular weight distribution curves, and refers to a polyethylene product having two distinct but possibly overlapping populations of polyethylene macromolecules each having different weight average molecular weights. By the term "polyethylene with a multimodal molecular weight distribution" or "multimodal" polyethylene product it is meant polyethylene with a distribution curve being the sum of at least two, preferably more than two unimodal distribution curves, and refers to a polyethylene product having two or more distinct but possibly overlapping populations of polyethylene macromolecules each having different weight average molecular weights.

In one embodiment of the present invention, the polyethylene is particulate and has a D50 ranging from 100 to 1400 µm, with D50 being defined as the particle size for which fifty percent by weight of the particles has a size lower than the D50.

The measurement of the particle size can be made by sieving techniques. The sieving can be performed with a set of calibrated sieves according to ASTM D-1921-89 particle (sieve analysis) of Plastic Materials, Method A.

In one embodiment of the present invention, the polyethylene is in the form of a fluff or a powder. For the purpose of this invention, "resin", "powder" or "fluff" is defined as the polymer material after it exits the polymerization reactor (or final polymerization reactor in the case of multiple reactors connected in series).

Preferably, said polyethylene is prepared in at least three reactors connected in series.

In an embodiment, said polyethylene is prepared in at least three polymerization reactors, selected from gas phase reactor and/or continuous stirred-tank reactors and/or loop reactor connected in series.

The invention further encompasses formed articles comprising the metallocene produced polyethylene according to any one of the embodiments presented herein. Due to the improved mechanical properties of the polyethylene of the invention, it is suitable for a wide variety of applications. Preferred articles are pipes, caps and closures, fibers, films, sheets, containers, foams, rotomoulded articles and injection molded articles. Most preferred articles are pipes and caps and closures.

The invention further relates to a process for preparing the uncompounded particulate metallocene-produced polyethylene according to the invention, in at least three serially connected reactors, comprising the steps of
(i) polymerizing ethylene, optionally a comonomer, in the presence of a metallocene catalyst in the first reactor to produce a first polyethylene fraction,
(ii) feeding the first polyethylene fraction thereby produced, to the second reactor serially connected to the first reactor, and in the second reactor polymerizing ethylene and optionally a comonomer in the presence of the first polyethylene fraction thereby producing a second polyethylene fraction; and
(iii) feeding the second polyethylene fraction thereby produced, to a third reactor serially connected to the second reactor, and in the third reactor polymerizing ethylene and optionally a comonomer in the presence of the second polyethylene fraction thereby producing the polyethylene product.

Preferably, the process for preparing the uncompounded particulate metallocene-produced polyethylene in at least three serially connected reactors, comprises the steps of
(i) polymerizing ethylene, optionally one or more comonomers, in the presence of a metallocene catalyst, and optionally hydrogen, in the first reactor to produce a first polyethylene fraction,
(ii) feeding the first polyethylene fraction thereby produced, to the second reactor serially connected to the first reactor, and in the second reactor polymerizing ethylene and optionally one or more comonomers in the presence of the first polyethylene fraction, and optionally hydrogen, thereby producing a second polyethylene fraction; and
(iii) feeding the second polyethylene fraction thereby produced, to a third reactor serially connected to the second reactor, and in the third reactor polymerizing ethylene and optionally one or more comonomers in the presence of the second polyethylene fraction, and optionally hydrogen, thereby producing the polyethylene product.

Preferably, the polyethylene is prepared in at least three serially connected reactors, wherein at least the first reactor of the three reactors connected in series is configured to produce at least 10% by weight of polyethylene, based on the total weight of the polyethylene finally produced (by all three serially connected reactors).

In an embodiment, the first polyethylene fraction has a first melt index and a first molecular weight distribution, the second polyethylene fraction has a second melt index and a second molecular weight distribution, and wherein the first and second melt index are substantially the same and the first and second molecular weight distribution are substantially the same so that the first and second polyethylene fractions from a combined polyethylene fraction having monomodal molecular weight distribution.

In an embodiment said polyethylene is prepared in at least three serially connected reactors, wherein said reactors are selected from gas phase reactor, loop reactor, or continuous stirred-tank reactor (CSTR), connected in series or combinations thereof.

In an embodiment said polyethylene is prepared in a Spherizone® process i.e. a multi-zone circulating reactor. Reactors where multiple reaction zones are possible include Spherizone reactor employing two reactor zones under fast fluidization and the packed moving-bed regimes, (U.S. Pat. No. 5,698,642) and those described in U.S. Pat. No. 6,413,477. Combinations of the above types of processes are also applicable e.g. one or more continuous stirred-tank reactor (CSTR), and/or one or more slurry loop reactor, followed by a Spherizone® for example.

Said polyethylene can be prepared in at least three continuous stirred-tank reactors (CSTR), connected in series.

Alternatively, said polyethylene can be prepared in at least three loop reactors, connected in series, under slurry conditions.

Alternatively, said polyethylene is prepared in at least three gas phase reactors, connected in series.

In an embodiment, two of the at least three reactors connected in series operate in given conditions in order to produce substantially identical products.

Preferably, two of the at least three reactors connected in series operating in given conditions in order to produce substantially identical products are the first two reactors.

In an embodiment, the catalyst is introduced in the first reactor only.

Preferably said polyethylene is produced in at least three loop reactors connected in series. Each loop reactor comprises interconnected pipes, defining a reactor path, and wherein a polymerization slurry is preferably pumped through the loop reactor.

The present invention also encompasses a process for the polymerization of olefin, comprising the step of: polymerizing an olefin in the presence of at least one catalyst, optionally one or more co-monomers, and optionally hydrogen, thereby obtaining an polyolefin product, wherein said polymerization is performed in at least three slurry loop reactors connected in series, wherein each reactor comprises two vertical pipes, one upper segment, and one lower segment of reactor piping, joined end to end by junctions to form a complete loop, said reactor further comprising one or more feed lines, one or more outlets, one or more cooling jackets per pipe, and at least one pump.

As used herein, the term "olefin" refers to an alpha-olefin monomer that is to be polymerized. This alpha-olefin monomer may be selected from ethylene, 1-propylene, 1-butene, 1-pentene, 1-hexene, 1-octene, and any combination thereof. Preferred examples of alpha-olefin monomer are ethylene and propylene.

Preferably said alpha-olefin is ethylene. Suitable ethylene polymerization includes but is not limited to homopolymerization of ethylene, copolymerization of ethylene and a higher 1-olefin co-monomer.

The olefin monomer polymerizes in a liquid diluent, in the presence of a catalyst, optionally in the presence of a co-monomer (e.g. 1-hexene), and optionally in the presence of hydrogen. In each reactor, the slurry is maintained in circulation by an axial pump. The polymerization heat can be extracted by the water cooling jackets.

In this embodiment the polymerization can be performed under slurry conditions, wherein the product usually consists of solid particles and is in suspension in the diluent. The slurry contents of each reactor are circulated continuously with a pump to maintain efficient suspension of the polymer solid particles in the liquid diluent.

As used herein, the term "polymerization slurry" or "polymer slurry" or "slurry" means substantially a multi-phase composition including at least polymer solids and a liquid phase, the liquid phase being the continuous phase. The solids include catalyst and a polymerized olefin, such as polyethylene. The liquids include an inert diluent, such as isobutane, dissolved monomer such as ethylene, co-monomer, molecular weight control agents, such as hydrogen, antistatic agents, antifouling agents, scavengers, and other process additives.

Diluents which are suitable for being used in accordance with the present invention may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment, said diluent is isobutane. However, it should be clear from the present invention that other diluents may as well be applied according to the present invention.

In an embodiment, reactants comprising the monomer ethylene, isobutane as hydrocarbon diluent, a catalyst, and optionally the co-monomer 1-hexene, are used.

In an embodiment, the process comprises the steps of:
(i) polymerizing an olefin, optionally a comonomer, in the presence of a catalyst, and optionally hydrogen, in a first loop reactor to produce a first polyolefin fraction, said first loop reactor comprising two vertical pipes, one upper segment, and one lower segment of reactor piping, joined end to end by junctions to form a complete loop, said first loop reactor further comprising one or more feed lines, one or more outlets, one or more cooling jackets per pipe, and one axial pump configured to maintain in circulation the polymerization slurry,
(ii) feeding the first polyolefin fraction thereby produced, to a second loop reactor serially connected to the first loop reactor, and in the second loop reactor polymerizing olefin and optionally a comonomer in the presence of the first polyolefin fraction, and optionally hydrogen, thereby producing a second polyolefin fraction, said second loop reactor comprising two vertical pipes, one upper segment, and one lower segment of reactor piping, joined end to end by junctions to form a complete loop, said second loop reactor further comprising one or more feed lines, one or more outlets, one or more cooling jackets per pipe, and one axial pump configured to maintain in circulation the polymerization slurry, and
(iii) feeding the second polyolefin fraction thereby produced, to a third loop reactor serially connected to the second loop reactor, and in the third loop reactor polymerizing olefin and optionally a comonomer in the presence of the second polyolefin fraction, and optionally hydrogen, thereby producing a polyolefin product, said third loop reactor comprising two vertical pipes, one upper segment, and one lower segment of reactor piping, joined end to end by junctions to form a complete loop, said third loop reactor further comprising one or more feed lines, one or more outlets, one or more cooling jackets per pipe, and one axial pump configured to maintain in circulation the polymerization slurry.

In an embodiment, two of the at least three slurry loop reactors connected in series operate in given conditions in order to produce substantially identical products.

In an embodiment, said two of the at least three slurry loop reactors connected in series operating in given conditions in order to produce substantially identical products are the first two loop reactors.

In an embodiment, the process comprises
(i) polymerizing ethylene, optionally a comonomer, in the presence of a catalyst in the first loop reactor to produce a first polyethylene fraction, said first loop reactor being as defined above,
(ii) feeding the first polyethylene fraction thereby produced, to the second loop reactor serially connected to the first loop reactor, and in the second loop reactor polymerizing ethylene and optionally a comonomer in the presence of the first polyethylene fraction thereby producing a second polyethylene fraction, said second loop reactor being as defined above, and
(iii) feeding the second polyethylene fraction thereby produced, to the third loop reactor serially connected to the second loop reactor, and in the third loop reactor polymerizing ethylene and optionally a comonomer in the presence of the second polyethylene fraction thereby producing a polyethylene product, said third loop reactor being as defined above.

Preferably, the process comprises
(i) polymerizing ethylene, optionally a comonomer, in the presence of a catalyst in the first loop reactor to produce a first polyethylene fraction having a first melt index and a first molecular weight distribution,
(ii) feeding the first polyethylene fraction thereby produced, to the second loop reactor serially connected to the first loop reactor, and in the second loop reactor polymerizing ethylene and optionally a comonomer in the presence of the first polyethylene fraction thereby producing a second polyethylene fraction having a second melt index and a second molecular weight distribution, and wherein the first and second melt index are substantially the same and the first and second molecular weight distribution are substantially the same so that the first and second polyethylene fractions from a combined polyethylene fraction having monomodal molecular weight distribution; and
(iii) feeding the second polyethylene fraction thereby produced, to a third loop reactor serially connected to the second loop reactor, and in the third loop reactor polymerizing ethylene and optionally a comonomer in the presence of the second polyethylene fraction thereby producing a polyethylene product, having a melt index and a molecular weight distribution.

In a preferred embodiment, reactants comprising the monomer ethylene, isobutane as hydrocarbon diluent, a supported metallocene catalyst, and optionally at least one co-monomer such as 1-hexene are used.

Preferably, said process is a process for the polymerization of ethylene, comprising the step of: polymerizing ethylene in the presence of at least one metallocene catalyst, optionally one or more co-monomers, and optionally hydrogen, thereby obtaining the uncompounded particulate metallocene-produced polyethylene according to the first aspect of the invention, wherein said polymerization is performed in at least three slurry loop reactors connected in series, wherein each reactor comprises two vertical pipes, one upper segment, and one lower segment of reactor piping, joined end to end by junctions to form a complete loop, said reactor further comprising one or more feed lines, one or more outlets, one or more cooling jackets per pipe, and at least one pump.

In an embodiment, the melt index of the second polyethylene fraction is within 5% of the melt index of the first polyethylene fraction.

In an embodiment, the first and second polyethylene fractions have substantially the same density. Preferably, the second polyethylene fraction has a density within 0.005 g/cm$^3$ of the density of the first polyethylene fraction.

In an embodiment, the polymerization is performed in at least three reactors, wherein a first reactor is connected in series to a second reactor, said second reactor being serially connected to a third reactor, and wherein the pressure is the first reactor is higher than the pressure in the second reactor, said pressure in the second reactor being also higher than the pressure in the third reactor.

In an embodiment, the density of said polyethylene product is between 0.900 g/cm$^3$ and 0.975 g/cm$^3$, more preferably between 0.925 g/cm$^3$ and 0.950 g/cm$^3$.

The polymerization in the at least three loop reactors can be carried out in the presence of any suitable catalyst as known in the art. Preferably, the catalyst is a metallocene catalyst or a Ziegler-Natta catalyst. The term "Ziegler-Natta catalyst" or "ZN catalyst" refers to catalysts having a general formula $M^1X^1_v$, wherein $M^1$ is a transition metal compound selected from group IV to VII, wherein $X^1$ is a halogen, and wherein v is the valence of the metal. Preferably, $M^1$ is a group IV, group V or group VI metal, more preferably titanium, chromium or vanadium and most preferably titanium. Preferably, $X^1$ is chlorine or bromine, and most preferably, chlorine. Illustrative examples of the transition metal compounds comprise but are not limited to $TiCl_3$, $TiCl_4$. Suitable ZN catalysts for use in the invention are described in U.S. Pat. Nos. 6,930,071 and 6,864,207, which are incorporated herein by reference. More preferably the catalyst is a metallocene catalyst. Even more preferably, the metallocene catalyst is a supported metallocene catalyst, as described herein above. In an embodiment, the catalyst is introduced in the first reactor only.

The polymerization can be performed over a wide temperature range. Preferably, the temperature is within the range of about 0° C. to about 110° C. A more preferred range is from about 60° C. to about 100° C., more preferably from about 80 to 110° C., The reactor pressure is preferably held between 20 and 100 bar, 30 to 50 bar, more preferably at pressure of 37 to 45 bar. In an embodiment, the slurry flow can be set between 5 and 15 m/s.

The present invention also encompasses an apparatus for the production of polyolefin comprising at least three loop reactors connected in series, wherein each of the at least three loop reactors comprises two vertical pipes, one upper segment, one lower segment of reactor piping, joined end to end by junctions to form a complete loop, one or more feed lines, one or more outlets, one or more cooling jackets per pipe, and at least one pump.

In an embodiment, the one or more feed lines are selected from line for feeding monomer, comonomers, hydrogen, and diluent in the reactor, a line for feeding polymerization catalyst in the reactor, and optionally a line for feeding an activating agent in the reactor.

In an embodiment, the one or more outlets are selected from settling legs and/or transfer lines.

As used herein, the term "loop reactor" refers to a closed circuit tubular polymerization reactor for the production of polyolefin, preferably polyethylene or polypropylene.

The apparatus of the present invention comprises at least three loop reactors connected in series with interconnected pipes, defining a continuous flow path for the polymer slurry.

Each loop reactor comprises two vertical pipes, one upper segment, and one lower segment of reactor piping, joined end to end by junctions to form a complete loop, one or more feed lines, one or more outlets, one or more cooling jackets per pipe, and at least one pump, thus defining a continuous flow path for a polymer slurry.

The vertical sections of the pipe segments are preferably provided with cooling jackets. Polymerization heat can be extracted by means of cooling water circulating in these jackets of the reactor. Said reactors preferably operate in a liquid full mode.

The reactants including monomer ethylene or propylene, a light hydrocarbon diluent and optionally a co-monomer and optionally hydrogen are introduced into the reactor by one or more feed lines. At least one reactor is also fed with catalyst, optionally in conjunction with a co-catalyst or activation agent, by means of one or more feed line. Alternatively, at least two reactors are fed with catalyst, optionally in conjunction with a co-catalyst or activation agent, by means of one or more feed lines. Alternatively, each of the reactors are fed with catalyst, optionally in conjunction with a co-catalyst or activation agent, by means of one or more feed lines. Preferably only the first reactor is fed with catalyst.

In a preferred embodiment, catalysts are introduced upstream from the circulation pump, while diluent, monomer, optionally co-monomers and reaction additives are preferably introduced downstream of the circulation pump.

In an embodiment, the reactors are connected to each others via one or more transfer lines and/or settling leg. In an embodiment, the reactors are connected to each other via one or more transfer lines. The bends in the transfer line can be long-radius bends, preferably having a radius of curvature that is equal to at least 10 times the diameter of the transfer line. Preferably, the slurry is re-injected to the main route at an angle of from 1 to 90 degrees, preferably at an angle of from 30 to 60 degrees, for instance around 45 degrees.

The polymerization slurry is maintained in circulation in the loop reactors. The polymerization slurry is directionally circulated throughout each loop reactor by one or more pumps, such as axial flow pump. The pump may be powered by an electric motor. As used herein the term "pump" includes any device from compressing driving, raising the pressure of a fluid, by means for example of a piston or set of rotating impellers. According to the present invention, the pump is preferably of axial type.

Preferably there is a decreasing pressure differential between each of the at least three slurry loop reactors connected in series, such that the first loop reactor operates at a higher pressure than the following loop reactor, which in turn operates at a higher pressure than the following loop reactor, thereby facilitating the correct direction for the polymerization slurry in the continuous flow path.

In an embodiment, each loop reactor is further provided with one or more settling legs connected to the pipes of the reactor. Intermediate polymer slurry or polymer product may be removed from the loop reactors, by continuous or periodical discharge through one or more settling legs along with some diluent. In the settling legs the solid content is increased with respect to its concentration in the body of the loop reactor.

The settling legs can be located on any segment or any elbow of the loop reactors. In said settling legs the polymerization slurry decants so that the slurry exiting the reactor is more concentrated in solid than the circulating slurry. This permits to limit the quantity of diluent that has to be treated and re-fed to the reactor. It will be understood that the discharge of said settling legs may be operated in a continuous or discontinuous mode.

The settling legs are preferably provided with an isolation valve. These valves may for example be ball valves. Under normal conditions these valves are open. These valves can be closed for example to isolate a settling leg from operation. Said valves can be closed when the reactor pressure falls below a chosen value.

Further, the settling legs can be provided with product take off or discharge valves. Discharging is performed in such a way that the volume discharged from a settling leg substantially corresponds to the volume of polymer slurry settled in said settling leg since its previous discharge. The discharge valve may be any type of valve, which can permit continuous or periodical discharge of polymer slurry, when it is fully open. An angle valve, or ball valve may be suitably used. For example, the valve may have such a structure that solid matter is prevented from accumulating or precipitating at the main body portion of the valve. However, the type and structure of the discharge valve can be selected by those skilled in the art as required. According an embodiment of the present invention the totality of settled slurry is discharged at each opening of the discharge valve. When a plurality of legs are employed, the discharge of the settled polymer slurry may be discharged in sequence on a rotating basis for more uniform discharging to a subsequent reactor or to a product recovery zone.

Downstream the valve, at the exit of the settling leg, a three-way valve is usually provided which allows the transfer of polymer slurry settled in the settling legs, either to a product recovery zone, or to the following loop reactor, by means of transfer lines. These transfer lines comprise generally cylindrical, intermediate product transfer lines and extend substantially horizontally from the exit of a settling leg of a reactor to the entry in the other reactor. In particular, the transfer line connects the three-way valve provided at the exit of the settling leg of one reactor, with the entry in the other reactor, where a piston valve is provided.

As used herein "product recovery zone" includes but is not limited to heated or non-heated flash lines, flash tank, cyclones, filters and the associated vapor recovery and solids recovery systems or transfer lines to a following reactor.

The transfer lines can be further provided with one or more means for controlling temperature, flow or pressure of the polymer slurry in said line. The means for controlling temperature may for instance comprise a jacket, like a cooling jacket. In addition, diluent flushing means can be provided preferably at the inlet of the transfer line. Isobutane flushing means enable to flush isobutane through the transfer line and to keep the line unplugged. This is important when the settling leg is put out of service. One of the advantages of such flush is that a settling leg can be put back in service after it was taken out of service.

The transfer lines for transferring polymer slurry from one to another loop reactor can be equipped by one or more valves, preferably piston valves at the outlet of the transfer line. The piston valves are capable of sealing the orifice by which the transfer line is connected to the loop reactor.

As a further safety measure in the event of polymer plugs or obstructions developing in the transfer line during operation, more than one product transfer lines can be provided between the polymerization loop reactors.

In the event that the transfer line becomes plugged or obstructed for any reason, or if a product flow rate beyond the capacity of the transfer line is desired, then polymer slurry can be withdrawn from one reactor through another transfer line and supplied to another polymerization reactor to permit continued operation of the system. The reactors are still working while transfer lines are out of operation.

More than one product transfer line may be used so that the use of settling legs is maximized and the transfer of diluent from the first reactor to the second reactor is minimized.

Preferably, the transfer lines for transferring polymer slurry from one to another reactor, are continuously flushed, e.g. with isobutane, in operation or not.

In another preferred embodiment, by operation in accordance with the present invention, all lines, vessels, pumps, valves, etc. can be kept free of clogging by means of flushing or purging with nitrogen or diluent, i.e. isobutane. It is to be understood that where necessary flushing and purging means and lines are available on the device according to the invention in order to avoid plugging, or blocking. This is useful for example when the reactor is to be completely emptied in order to make an intervention on the reactor.

In another preferred embodiment, it is to be understood that all lines or conduits applied in accordance with the present invention may be provided, where necessary with flow measuring means.

The transfer lines connect different parts of the reactor path, even the reactor path of the one same loop reactor. Preferably, the transfer lines are connected to the reactor path in a bend or "elbow" of the reactor path to facilitate easy connection. Preferably, the diameter of the transfer line (TL) is smaller than the diameter of the loop reactor pipes (DL), more preferably the TL:DL ratio is from 1:12 to 1:2, more preferably from 1:6 to 1:3. Preferably, the loop reactor pipes have a diameter of 51 to 61 cm (or 20-24 inch), for instance around 56 cm (or 22 inch). Preferably, the transfer line has a diameter of from 10 to 30 cm (or 4-12 inch), for example around 15 cm (or 6 inch)

Preferably, the transfer line has a different transit time for the slurry than the main reactor path. Preferably, the slurry flows in the main reactor path is from 5 to 15 m/s. Preferably, the slurry in the transfer line flows at a speed of higher than 7 m/s, more preferably higher than 10 m/s. Preferably, the transfer line carriers a fraction of the slurry of from 0.5 to 50%, preferably of 1 to 15% of the total flow rate.

Polymer product can be discharged from the last loop reactor preferably through two or more settling legs and sent via a conduit to a flash tank in order to separate the solid contents and the flash vapor. The flash vapor contains unreacted or under-reacted monomer, diluent and comonomers. In the present invention, the preferred monomer is ethylene or propylene, more preferably ethylene, the inert diluent is aliphatic hydrocarbon, preferably isobutane and the comonomer is an alpha-olefin having from 4 to 8 carbon atoms, preferably 1-hexene. The condensed vapor thus contains mostly ethylene, isobutane and 1-hexene. The solid product recovered from the flash tank is preferably polyethylene or polypropylene, more preferably polyethylene. It is dried and stored.

Figure 3:
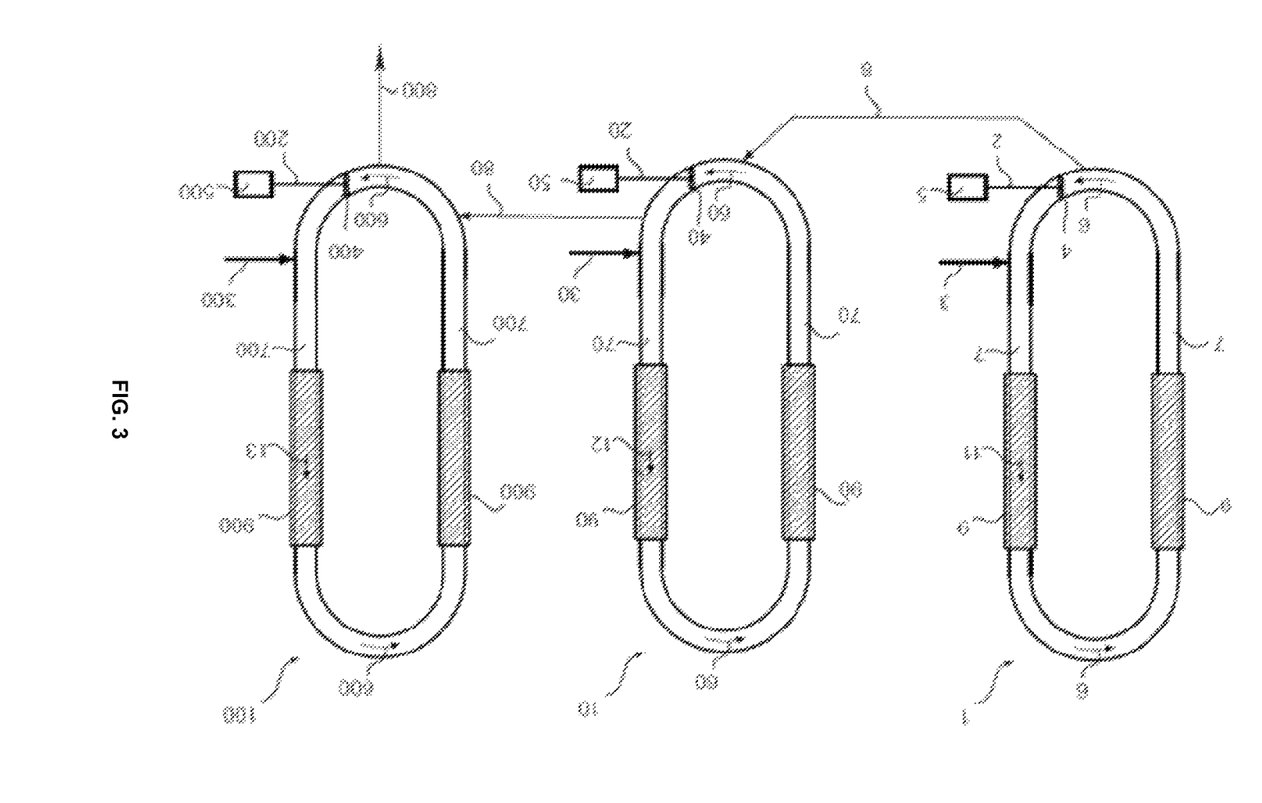
FIG. 3 schematically illustrates an apparatus comprising three serially-connected slurry loop reactors (1, 10, 100).

A non-limiting example of an apparatus according to the present invention is for instance illustrated in FIG. 3.

FIG. 3 schematically illustrates an apparatus comprising three serially-connected slurry loop reactors 1, 10, 100. Each of the slurry loop reactors comprises two vertical pipes (7, 70, 700), one upper segment, one lower segment of reactor piping, joined end to end by junctions to form a complete loop. The vertical sections of the pipe segments are preferably provided with cooling jackets 9, 90, 900. The reactants including monomer, a diluent and optionally a co-monomer and hydrogen are introduced into the reactors by feed lines 3, 30, 300. At least one reactor is also fed with catalyst, optionally in conjunction with a co-catalyst or activation agent, by means of one or more feed lines. The polymerization slurry is directionally circulated as illustrated by the arrows 6,60,600,11, 12, 13 throughout each loop reactor 1,10,100 by axial flow pump 2,20,200. Each pump 2,20,200 is powered by an electric motor 5,50,500, and comprises a shaft provided at its end with a set of rotating impellers 4,40,400. The first reactor 1 is connected to the second reactor 10 via one or more transfer lines 8. The second reactor 10 is further connected to the third reactor 100 via one or more transfer lines 80. The third reactor 100 is further provided with one or more settling leg 800 for discharging the product to a product recovery zone (not shown). The final polyolefin product produced by the multiple loop reactors is dependent upon a wide range of variables which may be separately adjusted in at least one or two loop reactor systems, including compositions of the fluidizing mediums in each loop reactor, the polymerization catalysts, the temperatures, pressures, flow rates and other factors maintained in the different reactor. Thus, polymerization apparatus of the present invention using the present multiple loop reactor has the operating flexibility to produce a broad spectrum of polyolefin polymers with varying physical properties.

It is clear from the present description that numbers and dimensions of the different parts of the reactor relate to the size of the polymerization reactors and can be changed in function of the reactor sizes.

In an embodiment, the uncompounded particulate metallocene-produced polyethylene according to the present invention, is produced in the apparatus described herein above, comprising at least three slurry loop reactors connected in series, comprising the step of: polymerizing ethylene in the presence of at least one metallocene catalyst, optionally one or more co-monomers, and optionally hydrogen.

In an embodiment, two of the at least three slurry loop reactors connected in series operate in given conditions in order to produce substantially identical products.

Preferably, two of the at least three slurry loop reactors connected in series operate in given conditions in order to produce substantially identical products, are the first two loop reactors.

In an embodiment, the uncompounded particulate metallocene-produced polyethylene according to first aspect is prepared in the apparatus described herein above; or according to the process of the third or fourth aspect.

Further combinations or preferred embodiments are disclosed in the claims and the Figures.

The following non-limiting example illustrates the invention.

EXAMPLES

Example 1 (Exp 1) is a bimodal polyethylene resin according to the invention prepared in three serially connected CSTRs, according to the present invention, in the presence of an ethylene-bis(tetrahydroindenyl) zirconium dichloride metallocene catalyst system.

Information regarding the polymerization conditions in Reactors 1, 2 and 3 can be found in Tables 1.

TABLE 1

|  |  | Reactor 1 | Reactor 2 | Reactor 3 |
|---|---|---|---|---|
| Ethylene | g/h | 175 | 60 | 90 |
| H2 | mg/h | 21 | 7 | 0 |
| Comonomer (1-hexene) | g/h | 0 | 0 | 13 |
| Solvent isobutane | g/h | 1853 | 249 | 300 |
| Temperature | °C. | 84.6 | 76.6 | 70.6 |

The particle size of the resin particles was determined and separated by sieving technique. The sieving operations were performed with a set of 7 calibrated sieves (63, 125, 250, 500, 1000, 1600, 2000 µm) according to ASTM D 1921-89 particle (sieve analysis) of Plastic Materials, Method A. The results are given in Table 2.

TABLE 2

| | Exp 1 | | | | | | |
|---|---|---|---|---|---|---|---|
| | Particle size (µm) | | | | | | |
| | 0-63 µm | 63-125 µm | 125-250 µm | 250-500 µm | 500-1000 µm | 1000-1600 µm | 1600-2000 µm |
| % by weight | 0.0 | 0.6 | 0.1 | 11.46 | 75.04 | 13.33 | 0.02 |

The molecular weight ($M_n$ (number average molecular weight), $M_w$ (weight average molecular weight) and molecular weight distributions d (Mw/Mn) were determined by size exclusion chromatography (SEC) and in particular by gel permeation chromatography (GPC). Briefly, a GPCV 2000 from Waters was used: 10 mg polyethylene sample was dissolved at 160° C. in 10 ml of trichlorobenzene for 1 hour. Injection volume: about 400 µl, automatic sample preparation and injection temperature: 160° C. Column temperature: 145° C. Detector temperature: 160° C. Two Shodex AT-806MS (Showa Denko) and one Styragel HT6E (Waters) columns were used with a flow rate of 1 ml/min. Detector: Infrared detector (2800-3000 cm$^{-1}$). Calibration: narrow standards of polystyrene (PS) (commercially available). Calculation of molecular weight Mi of each fraction i of eluted polyethylene is based on the Mark-Houwink relation ($\log_{10}(M_{PE})$=0.965909−$\log_{10}(M_{PS})$−0.28264) (cut off on the low molecular weight end at $M_{PE}$=1000).

The molecular weight averages used in establishing molecular weight/property relationships are the number average ($M_n$), weight average ($M_w$) and z average ($M_z$) molecular weight. These averages are defined by the following expressions and are determined form the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i M_i} = \frac{\sum_i h_i M_i}{\sum_i M_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight Mi. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

Figure 1:
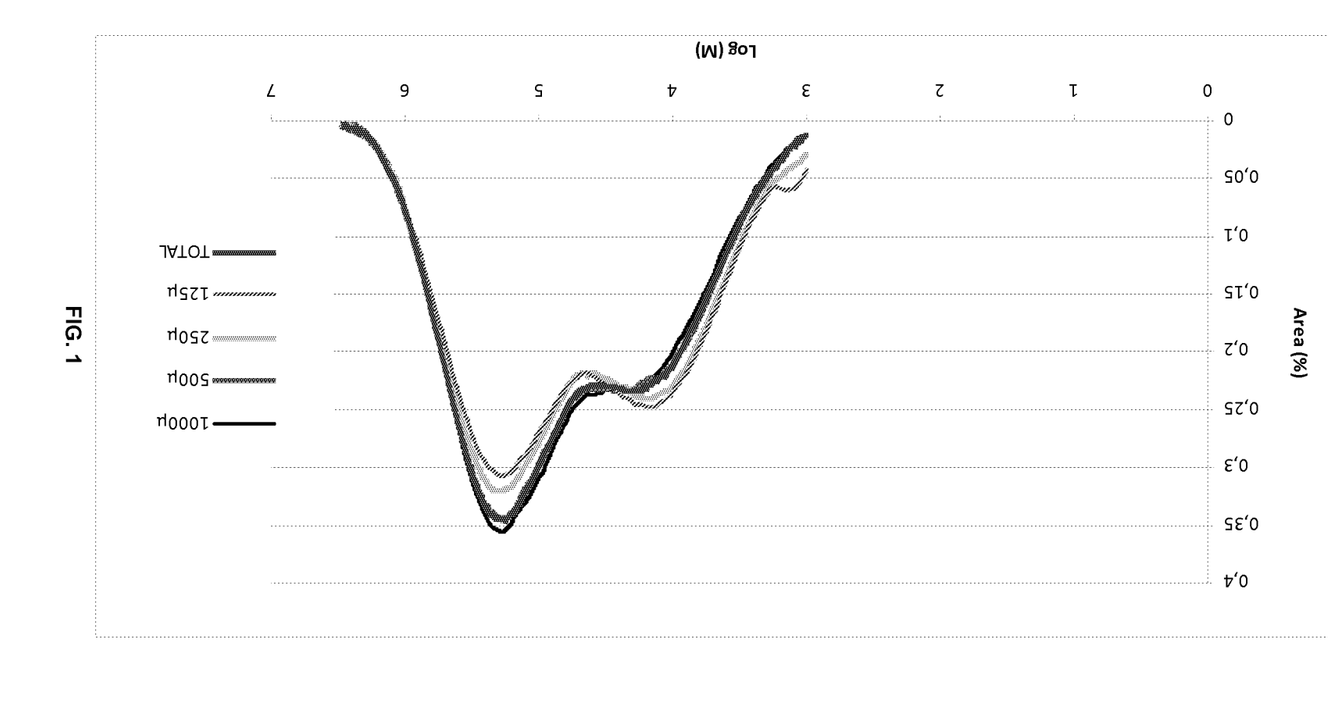
FIG. 1 represents the Gel Permeation Chromatography (GPC) curves of polymer fractions separated on the basis of particle size for an uncompounded particulate metallocene produced polyethylene according to an embodiment of the invention.

The results are given in Table 3. The GPC curves of the polymer fractions separated on the basis of particle size are shown in FIG. 1.

TABLE 3

| | Exp 1 | | | | | |
|---|---|---|---|---|---|---|
| | 1600-1000 µm | 1000-500 µm | 500-250 µm | 250-125 µm | Deviation (%) | TOTAL |
| Mn (g/mol) | 17391 | 16294 | 13769 | 12711 | 14.43 | 16428 |
| Mw (g/mol) | 163583 | 161335 | 155029 | 152266 | 3.35 | 162960 |
| D (Mw/Mn) | 9.4 | 9.9 | 11.3 | 12.0 | 11.33 | 9.9 |

The results show that the molecular weight distribution of the polyethylene according to the invention was homogenous and was the same independently of the size of the particles.

Comparative example 1 (Comp exp 1) is a bimodal polyethylene resin prepared in a double loop reactor in the presence of an ethylene-bis(tetrahydroindenyl) zirconium dichloride metallocene catalyst system. The polymerization was carried out in a double loop reactor comprising 2 reactors Rx1 and Rx2. Polymerization was carried at a temperature of 95° C. under a pressure of about 40 bars in RX1 and at a temperature of 85° C. under a pressure of about 40 bars in Rx2. Information regarding the polymerization conditions in Rx1 and Rx2 can be found in Tables 4.

TABLE 4

| Comparative example 1 | | | |
|---|---|---|---|
| First reactor (Rx1) operating conditions | Pressure | (Bars) | 42 |
| | Temperature | (° C.) | 95 |
| | Ethylene | (kg/h) | 18 |
| | Comonomer (1-hexene) | (Kg/h) | 0 |
| | H2 | (Nl/h) | 44 |
| Second reactor (Rx2) operating conditions | Pressure | (Bars) | 40 |
| | Temperature | (° C.) | 85 |
| | C2— | (kg/h) | 22 |
| | Comonomer (1-hexene) | (Kg/h) | 1.8 |
| | H2 | (Nl/h) | |

The particle size of the polyethylene particles of comparative example 1 was measured and separated as described for Example 1. The results are given in Table 5.

TABLE 5

| | Comp Exp 1 | | | | | | |
|---|---|---|---|---|---|---|---|
| | Particle size (μm) | | | | | | |
| | 0-63 μm | 63-125 μm | 125-250 μm | 250-500 μm | 500-1000 μm | 1000-1600 μm | 1600-2000 μm |
| % by weight | 0.15 | 3.84 | 23.51 | 52.56 | 19.63 | 0.31 | 0.00 |

Figure 2:
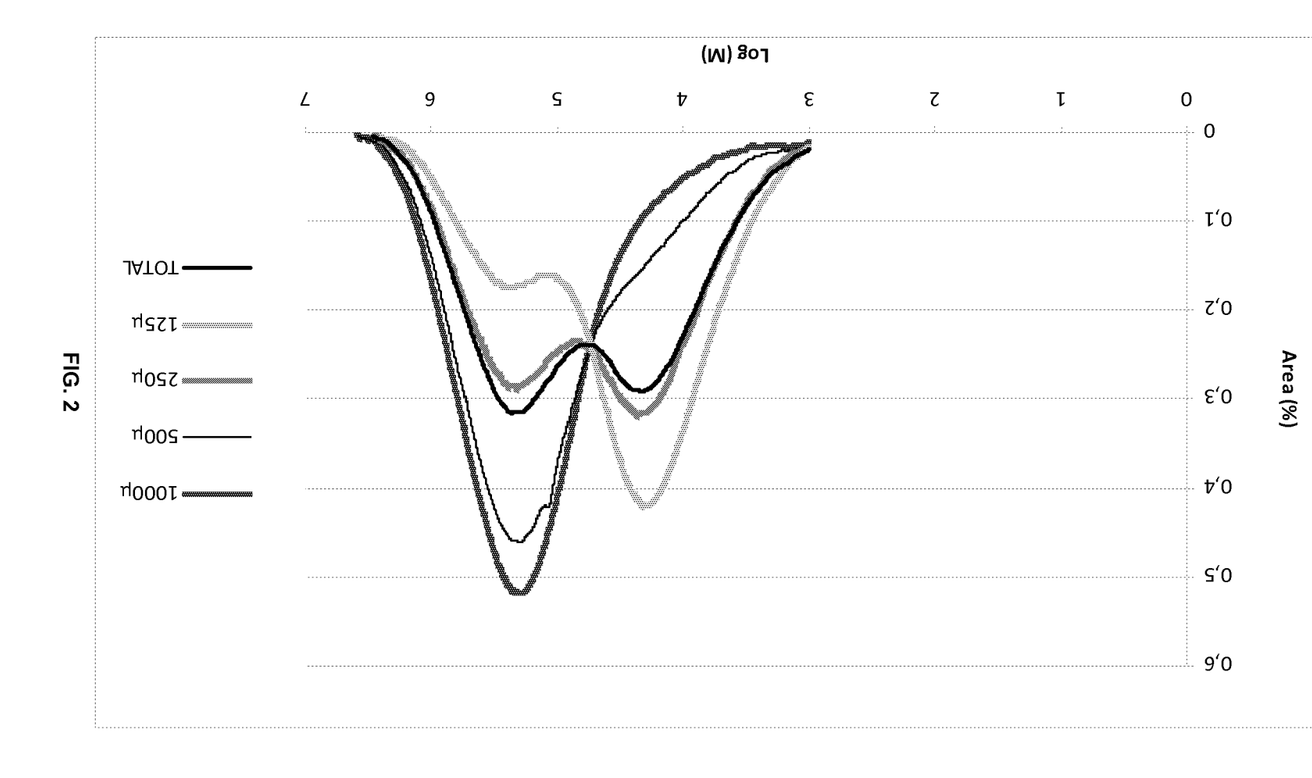
FIG. 2 represents the GPC curves of polymer fractions separated on the basis of particle size for a comparative metallocene produced polyethylene resin.

The molecular weight distributions were determined by GPC as described for Example 1. The results are given in Table 6. The GPC curves of the polymer fractions separated on the basis of particle size are shown in FIG. 2.

TABLE 6

| | Comp Exp 1 | | | | | |
|---|---|---|---|---|---|---|
| | 1600-1000 μm | 1000-500 μm | 500-250 μm | 250-125 μm | Deviation (%) | TOTAL |
| Mn (g/mol) | 44204 | 31417 | 16734 | 12563 | 55.11 | 17208 |
| Mw (g/mol) | 281768 | 250763 | 159404 | 104342 | 41.07 | 170836 |
| D (Mw/Mn) | 6.4 | 8 | 9.5 | 8.3 | 15.86 | 9.9 |

The results show that the molecular weight distribution of the comparative polyethylene is not homogenous and varies drastically for fractions of different particles sizes.

The invention claimed is:

1. An uncompounded particulate metallocene-produced polyethylene having:
 a multimodal molecular weight distribution, wherein the uncompounded particulate metallocene-produced polyethylene is a product of polymerizing a first polyethylene fraction in a first reactor, a second polyethylene fraction in a second reactor, and a third polyethylene fraction in a third reactor, the first polyethylene fraction having a density within 0.005 g/cm³ of the density of the second polyethylene fraction and so that the first and second polyethylene fractions form a combined polyethylene fraction having monomodal molecular weight distribution;
 a particle size distribution measured by obtaining at least four fractions by sieving, wherein one fraction contains an upper particle size, one fraction contains a lower particle size, and the other fractions contain particle sizes in between the upper particle size and the lower particle size, wherein the fraction containing the upper particle size ranges from 1000 microns to 1600 microns, and wherein the uncompounded particulate metallocene-produced polyethylene comprises an Mz/Mw ranging from 2.5 to 6.0;
 whereby:
 a set of Mw values comprises an Mw value of each fraction, with Mw being the weight-average molecular weight, characterized in that a ratio between a standard deviation value of the Mw set and a mean value of the Mw set is equal to or less than 0.15; and
 a set of Mn values comprises an Mn value of each fraction, with Mn being the number-average molecular weight, characterized in that a ratio between a standard deviation value of the Mn set and a mean value of the Mn set is equal to or less than 0.15;
 prepared in an apparatus comprising at least three slurry loop reactors connected in series, wherein each of the at least three slurry loop reactors comprises:
 two vertical pipes, one upper segment of reactor piping, and one lower segment of reactor piping joined end to end by junctions to form a complete loop;
 one or more feed lines;
 one or more outlets;
 one or more cooling jackets per pipe; and
 at least one pump.

2. The uncompounded particulate metallocene-produced polyethylene according to claim 1, wherein the multimodal molecular weight distribution is a bimodal molecular weight distribution.

3. Formed articles comprising the uncompounded particulate metallocene-produced polyethylene according to claim 1.

4. A process for preparing the uncompounded particulate metallocene-produced polyethylene according to claim 1 comprising:
 polymerizing ethylene in the presence of at least one metallocene catalyst, optionally one or more co-monomers, and optionally hydrogen in an apparatus, thereby obtaining the uncompounded particulate metallocene-produced polyethylene, wherein the apparatus comprises at least three slurry loop reactors connected in series, wherein each of the at least three slurry loop reactors comprises:
 two vertical pipes, one upper segment of reactor piping, and one lower segment of reactor piping joined end to end by junctions to form a complete loop;

one or more feed lines;
one or more outlets;
one or more cooling jackets per pipe; and
at least one pump.

5. The process according to claim 4, wherein two of the at least three slurry loop reactors connected in series operate in given conditions in order to produce substantially identical products, wherein the two of the at least three slurry loop reactors connected in series that operate in the given conditions in order to produce substantially identical products are the first two loop reactors of the at least three slurry loop reactors connected in series.

6. The uncompounded particulate metallocene-produced polyethylene of claim 1, wherein the uncompounded particles have a D50 ranging from 100 to 1400μ, with D50 being defined as the particle size for which fifty percent by weight of the particles have a size smaller than the D50.

7. The uncompounded particulate metallocene-produced polyethylene of claim 1, comprising an Mw of between 25,000 and 300,000 Daltons.

8. The uncompounded particulate metallocene-produced polyethylene of claim 1, wherein the melt index of the second polyethylene fraction is within 5% of the melt index of the first polyethylene fraction.

* * * * *

UNITED STATES PATENT AND TRADEMARK OFFICE
CERTIFICATE OF CORRECTION

| | | |
|---|---|---|
| PATENT NO. | : 10,465,021 B2 | Page 1 of 1 |
| APPLICATION NO. | : 14/417735 | |
| DATED | : November 5, 2019 | |
| INVENTOR(S) | : Aurelien Vantomme, Christopher Willocq and Daan Dewachter | |

It is certified that error appears in the above-identified patent and that said Letters Patent is hereby corrected as shown below:

On the Title Page

Item (73) Assignee, "FINA TECHNOLOGY, INC., Houston, TX (US)" should be TOTAL RESEARCH & TECHNOLOGY FELUY, Seneffe (BE)

Signed and Sealed this
Ninth Day of June, 2020

Andrei Iancu
*Director of the United States Patent and Trademark Office*